Patented May 22, 1934

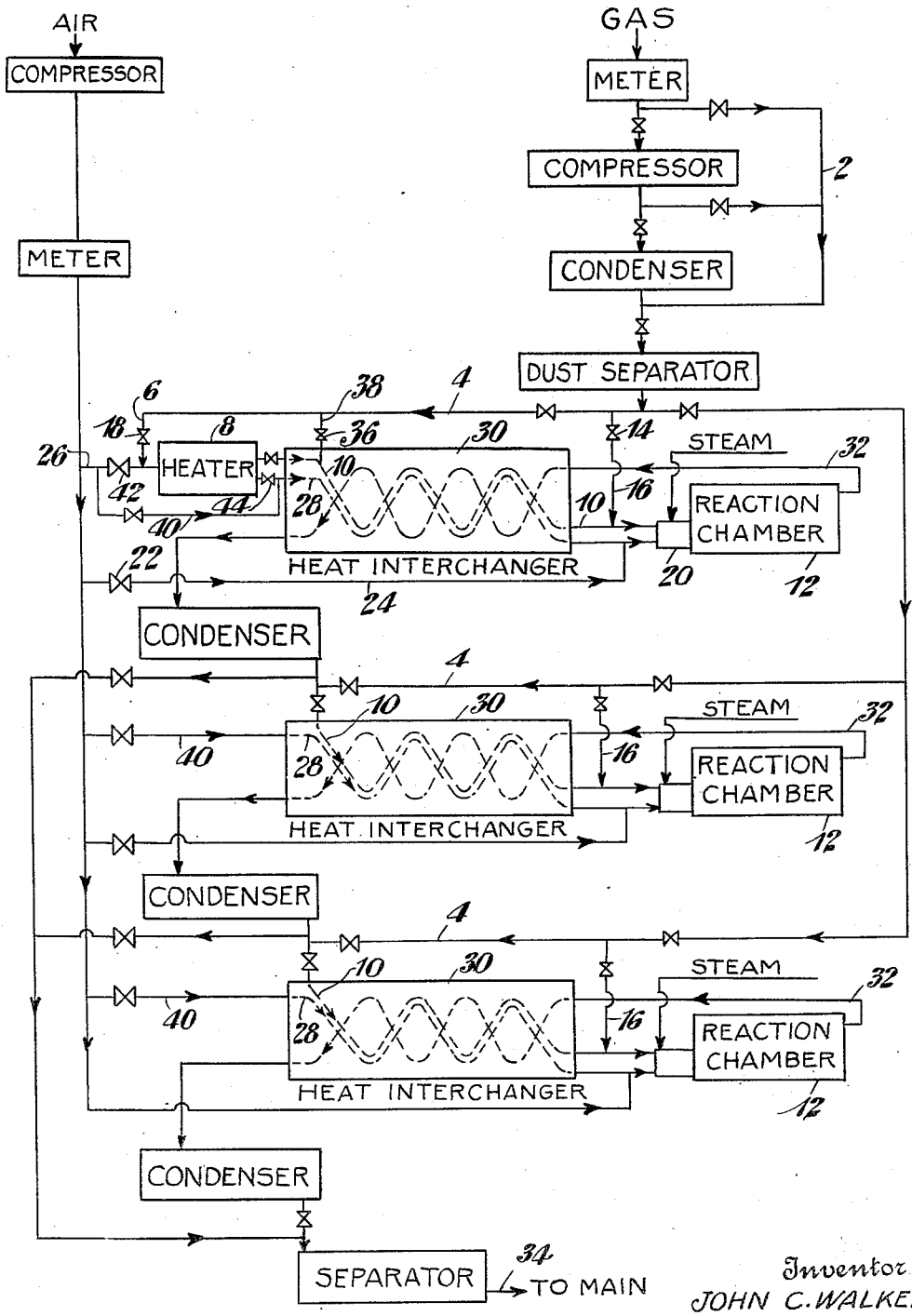

1,960,212

UNITED STATES PATENT OFFICE 1,960,212

REMOVAL OF OXYGEN FROM COMBUSTIBLE GASES

John C. Walker, Bartlesville, Okla., assignor to Empire Oil & Refining Company, Bartlesville, Okla., a corporation of Delaware Application February 3, 1927, Serial No. 165,656

18 Claims. (Cl. 23—3)

The present invention relates to the treatment of gas and more particularly to the treatment of natural gas to remove the oxygen therefrom and at the same time provide or leave a fuel which is well adapted for domestic and industrial heating purposes.

Considerable difficulty and inconvenience has been experienced with gas mains carrying natural gas, due to corrosion and interference of the dust therefrom with the proper functioning of pumps, valves, meters and other equipment. The iron of the gas mains on corroding forms hydrated iron oxide, commonly known as "iron rust". As corrosion proceeds small amounts of this rust finally detach themselves from the main and if the velocity of the gas stream is high the rust is picked up and carried along with the gas. It is probable that the impact of the small particles of rust carried in the gas stream against other particles adhering to the walls of the main causes the separation of such adhering particles from the walls so that the rust is carried along by the gas stream in continuously increasing amounts. Gas carrying a large amount of this dust is very abrasive, and in passing through restrictions in the pipe, such as valves, regulators, bends, and the like, the abrasive gas stream causes severe cutting of the equipment, particularly the regulator valves and seats and valve gates and seats, ultimately causing this equipment to leak badly and necessitating frequent replacement. Compressors, liners, piston valves, rods and other parts coming in contact with this abrasive gas undergo rapid wear with resultant large expenditures in compressor station upkeep. Moreover, in addition to the depreciation of the natural gas mains and compressor equipment caused by corrosion and dust abrasion, there may at times be partial or complete interruption of the transportation service due to the fact that the dust, when moistened with oil from the compression equipment or with water from the gas, sometimes collects and packs at bends or restrictions in the line.

The inconvenience due to this dust together with the losses in equipment due to corrosion has been particularly noticeable in the modern systems in which suction is applied to draw the gas from low pressure wells or from wells normally yielding only a small amount of gas. Where such methods must be or are applied it is impossible to prevent the seepage into the suction side of the pumping equipment and mains of a small amount of air, and the oxygen and moisture (water) content of this seepage air and the natural moisture content of the gas has been found to be the cause of the corrosion and consequently the cause of the formation of dust in the mains.

From a careful study of the conditions surrounding the handling of such gas it has been found that the removal of either the oxygen or the moisture (water) content of the gas will render it non-corrosive. Since the removal of water from the very large volumes of gas treated per day would be relatively expensive, the relatively economical process of the present invention has been devised to destroy or remove the free oxygen from the gas and thus accomplish the same end.

Under ordinary circumstances natural gas contains little or no oxygen, but where pumping methods are used the resulting gas may contain as high as 5% or sometimes even more oxygen. When this gas, which usually contains on the average of about one percent oxygen and always a small amount of water, is compressed for transportation or distribution the mains become filmed with water and absorbed oxygen which immediately start corrosion. It has been found that the rate and amount of corrosion is greatly increased as the pressure of the gas increases. For example, natural gas containing 1% air under atmospheric pressure, when compressed to 20 atmospheres has a corrosive effect greater than gas at the same temperature containing 20% air but at atmospheric pressure. Therefore under improved methods of transportation or distribution where pressure upwards of 200 to 300 pounds per square inch is used on the mains it becomes of utmost importance to have the gas non-corrosive before it is passed for transportation or distribution.

The actual mechanism of the reactions and interaction between oxygen, water, iron and the compounds formed therefrom in the corrosion of iron is so generally known that a discussion on this point is deemed unnecessary to a complete understanding of the invention, since it relates primarily to the prevention of these reactions by removing one of the elements upon which they depend.

Therefore, the primary object of the present invention is to provide a process for the treatment of natural or other combustible and non-combustible gas to remove or destroy its free oxygen content, thereby preventing corrosion of and consequent dust formation in gas mains and associated equipment.

There has been found to be a wide variation in the heating value of the various types of natural gas which are handled in the collection, transportation and distribution systems in the natural gas producing areas. For instance, some of these systems handle gases ranging in calorific value from 600 to 700 B. t. u. per cubic ft. to as high as 1800 B. t. u. per cubic ft. or even higher. In order to provide their customers with satisfactory service those collecting gas of widely variable heating value recognize the importance of finally distributing gas having the most desirable uniform heating value, flame temperature, and other qualities.

Another object of the invention is to control the composition and heating value of the gas and provide a good combustible fuel gas suitable for domestic and industrial purposes.

To accomplish these as well as other objects the gas from which the oxygen is to be removed may be conducted from the gas supply main through a meter, compressor and condenser by which the gas may be put under the desired pressure and any condensable products removed, if such removal is desired. The successful operation of the process, however, does not depend on the removal of condensable hydrocarbons from the gas so that the apparatus requirements of the system need not include a condenser even though condensable products are known to be present in the gas. If the gas is already under the desired pressure the compressor as well as the condenser may be dispensed with. In any case, the gas is next preferably passed through a dust separator where any foreign matter is removed. The gas leaving the separator may be preheated and a definite proportion of cold air or preheated air may be added thereto, or a definite proportion of cold air may be added to the gas and the mixture may be preheated and passed into a reaction chamber containing a catalyst which has previously been heated to the reaction temperature. It is preferred to preheat the gas only and to add cold air or air carrying only its heat of compression to the hot gas just prior to its introduction into the reaction chamber. In the catalyst chamber an exothermic reaction resembling combustion takes place by which the free oxygen of the gas and air mixture is combined with combustible constituents of the gas and the reaction temperature thereby maintained. The reaction temperature may be controlled by controlling the proportion of air added to the gas. The high temperature gas leaving the catalyst chamber may be passed into a heat interchanger which may be used to perform the preheating referred to above. The gas is further cooled in a condenser which also removes any condensable constituents and may then be passed through a liquid gas separator or absorber where additional water or entrained liquids are removed before the gas is passed into the gas distributing main. In some cases the absorber or separator may be dispensed with and simple traps in the condensing coils substituted therefor. Where an absorber or separator is used, any further chemical treatment of the gas which may be found necessary may be accomplished therein.

The novel process will now be described in detail, reference being had to the accompanying drawing in which The figure is a diagrammatic sketch or flow sheet of the process.

To carry out the process illustrated by the flow sheet shown in the drawing, the gas, which may be any combustible or other gas containing free or uncombined oxygen, but which for the purpose of the description is taken to be natural gas of high B. t. u. value, is drawn from a gas main, preferably as near as possible to the gas source, and passed through a meter from which the rate of flow and volume of gas to be treated may be determined. From the meter the gas may be passed through a compressor and condenser to remove any readily condensed hydrocarbons such as the natural gas-gasoline hydrocarbons, or if the gas is known to contain none of these products, or if their removal is not desired, and if the gas is already under the desired pressure for processing it may be by-passed around the compressor and condenser by a conduit 2. From the condenser or the by-pass line 2 the gas enters a suitable dust separator where any dust or foreign matter in the gas is removed. In starting up the process it is necessary to bring the reaction chamber up to the reaction temperature, which at the start of the reaction should be from 600 to 1000° F. After the reaction has once started the heat of the reaction is usually sufficient to maintain the desired temperature in the reaction chamber. To bring the reaction chamber up to the desired temperature for starting the reaction, gas leaving the dust separator is passed by lines 4 and 6 through a heater 8 then by line 10 into a reaction chamber 12 until the temperature therein is 600° F. or above. During this preliminary heating period a valve 14 in pipe 16 is closed and valve 18 in pipe 6 is used to regulate the amount of gas being passed through the heater. While 600° F. has been found to be about the lowest temperature which can be used in first initiating the reaction, it has also been observed that when platinum for example, is used as a catalyst in the reaction chamber the reaction between the free oxygen and the combustible constituents of the mixture is noticeable at temperatures as low as 400° F. under atmospheric pressure conditions, and that the reaction will take place at temperatures below 400° F. with a platinum catalyst when superatmospheric pressures are employed. The minimum temperatures which may be employed in starting up the reaction and in maintaining suitable operation in the reaction chamber depend primarily on the type of catalyst which is used, on the degree of super-atmospheric pressure employed, on the amount of preheat imparted to the gas-air mixture prior to its introduction into the reaction zone, and also on other variables.

Assuming that the reaction chamber 12 has been raised to the desired temperature, valve 14 may be opened and valve 18 closed. The gas is thereby forced through pipes 16 and 10 into a mixing chamber 20 where it is mixed with a definite quantity of air conducted through a valve 22 and pipe 24 from a compressor and meter as shown in the drawing. The amount of air supplied may be regulated by the speed of the compressor or by the valve 22, or both. If desired the valve 22 in pipeline 24 may be closed and air may be passed by a valved pipe 26 into the heater 8. If this is done the heater 8 may serve as a premixing chamber wherein the air is mixed with gas entering the system through valve 18, valve 14 being closed. From the chamber 8 the gas or mixture passes either by valved pipe coil 10 or by a valved pipe coil 28 through a heat interchanger 30 into mixing chamber 20 and thence into the reaction chamber 12, where the oxygen in the gas and air is completely united with a part of the combustible constituents of the gas by what may be termed a catalytic oxidation reaction. The highly heated gaseous products of the reaction leave the reaction chamber by a pipe 32 and are preferably passed through the heat interchanger 30 wherein they give up the greater part of their heat to the incoming gas or gas-air mixture, thence thru a water-cooled condenser and liquid gas separator or absorber, the treated gas finally being passed to a gas supply main by a pipe 34.

The reaction chamber 12, which may be of any approved construction commonly used in catalytic gas reactions, is preferably lined inside with insulating material on the inner surface of which may be cemented porous material such as pumice or alundum. On the surface of this porous material there is precipitated a catalyst. Very good results have been obtained with a catalytic charge comprising ten grams of metallic platinum per cubic ft. of pumice material. Excellent results have also been obtained with palladium, chromium, manganese, copper and nickel and also with gold, silver, and oxides of copper, manganese and other metals that form higher and lower oxides, such as iron, nickel, vanadium, chromium, molybdenum and cerium. Likewise any mixture or alloy of the catalysts named above may be used. Moreover, instead of cementing the refractory material onto the wall of the reaction chamber a thick bed of pumice or other porous refractory may be maintained in the reaction chamber either with or without the use of perforated plates as supporting trays.

In carrying on the process a certain proportion of air or oxygen in the air-gas mixture is required in order to initiate the reaction and to maintain the temperature in the reaction zone. The proportion with respect to the latter varies however with the temperature to which the mixture is preheated before entering the reaction chamber. For example, taking a certain gas under a pressure of 55 pounds per square inch and having an inlet temperature of 80° F. the minimum air required to maintain the reaction was 35%, while the same gas under the same pressure and preheated to 410° F. required only 7.8% air to maintain the reaction. Therefore, assuming that a definite mixture of natural gas and air is being treated the temperature of the reaction chamber may be regulated by the amount of preheat given the gas-air mixture. Referring to the drawing this may be accomplished by proper regulation of valve 42 in pipe 26, the valve 22 in pipe 24, the valve 14 in pipe 16, the valve 18 in pipe 6 and the valve 36 in by-pass 38. Thus by regulation of these valves a portion or all of the gas or air may be by-passed around the heater and heat interchanger to give the temperature desired in the entering mixture. In order to avoid undesirable reactions which might take place in the interchanger in some cases where the air and gas are preheated together, the air may be heated separately from the gas in the coils 28 of the interchanger, or else the air may be passed around the interchanger through the pipe 24 and added directly to the gas in chamber 20 just before the gas enters the reaction chamber 12. A control of the temperatures in the reaction chamber may also be effected to some extent by controlling the degree of preheat imparted to this air. When it is desired to use a very small amount of air (less than 8%) a portion or all of the gas may be passed through the heater 8 by opening valve 18, while the remainder of the gas may be passed either through valve 36 and the heat interchanger coils 10 or directly into mixing chamber 20 through pipe 16, controlled by valve 14. By this arrangement any desired preheat in the air-gas mixture may be obtained for adjusting the temperature in the reaction zone.

When operating with certain proportions of gas and air under rather high preheat, it may be desirable to effect the mixture only as they enter the reaction chamber. To accomplish this, air is taken by way of a valved branch line 40 (valves 22, 42 and a valve 44 at the head of coil 28 being closed) and passed in a separate circuit through the coils 28 of the heat interchanger 30 as indicated in the drawing. The individually preheated air is then passed into the chamber 20 and mixed with the gas therein just before it enters the chamber 12. While the air is thus being preheated in an independent circuit the gas may pass through lines 4, 38 and interchanger coils 10 whereby it also receives preheat, or if additional preheat is desired on the gas, a portion or all of it may be passed through the pipe 4 and the valved branch line 6 into the heater 8 and thence through the interchanger coils 10 into reaction chamber 12 by way of mixing chamber 20.

The apparatus may advantageously include one or more gas mixing devices functioning like illustrated heater 8 and chamber 20, for effecting the complete mixing of the combustible gas and air prior to its entry into the chamber 12 and to prevent explosions in other parts of the apparatus if mixture is effected prior to the preheating step. Whether or not such mixing devices are employed it has been found advantageous to keep the air under a slightly higher pressure than the combustible gas so that a mixing of the two may be made by jetting the former into the latter and to prevent gas flowing back into air mains.

The reaction in the chamber 12 between the oxygen and combustible gas in the mixture of gases proceeds with great rapidity and when relatively large proportions of air are being used the temperature may tend to rise too high, although temperatures of from 1200° to 1800° F. are not objectionable. However, in order to prevent further rise of the temperature in the reaction zone provision is made for introducing steam into the gas-air mixture as it enters this zone. The presence of steam in the mixture gives rise to the endo-thermic reaction for the formation of water gas and thus keeps the temperature down. Unless the heating value of the gas being treated is rather high, say 1600 B. t. u., and the gas desired is only around 800 to 900 B. t. u. it may be unnecessary to introduce steam into the reaction chamber because the water formed in the catalytic oxidation reaction will by being converted to water gas help to hold the temperature below the limit indicated.

In cases where it is desired to treat a gas having a relatively high heating value, for example one ranging from 1500 to 1800 B. t. u. per cubic foot for removal of its free oxygen content, and where it is also desired to produce a gas having a substantially uniform lower heating value, for example one ranging from 900 to 1000 B. t. u. per cubic foot, the amount of air which it would be necessary to add to the gas in order to accomplish this relatively large reduction in its heating value would produce such high temperatures in the reaction chamber that it would be necessary to use relatively large volumes of high pressure steam in order to maintain suitable controlled temperature conditions in the reaction chamber. In order to avoid the apparatus investment which would be necessary for providing such large volumes of high pressure steam, the apparatus assembly of the present invention has been so designed (see the drawing) that the gas may be treated in several successive stages, if desired, by addition of small quantities of air to each stage. According to this step-oxidation method of treatment, the gas is passed successively through a number of reaction chambers connected in series, with addition of a small enough proportion of the total air required to reduce the heating value of the gas to the desired point, to each stage, so that the desired or preferred reaction temperature is maintained in each stage without overheating. The number of stages necessary is determined by the temperature desired in each stage, and by the total amount of air which it is necessary to add in order to effect the desired reduction in the heating value of the gas. The treated gas is preferably cooled between stages by passing it through the heat interchanger and condenser equipment illustrated in the drawing, and any condensate is trapped off before admixing air for the next stage. The apparatus is preferably so arranged that the gas or the air, or both, may if desired be preheated by interchange or otherwise between the stages. The same catalyst may be used in all stages or different types of catalysts may be used in any one or all of the stages, as desired. As shown in the drawing the apparatus is preferably so arranged that when the treatment can be effectively and economically completed in one stage, each unit apparatus assembly of heat interchanger, reaction chamber, and condenser may be operated in parallel with the other unit assemblies in the treatment of separate portions of gas taken from the main supply with separate portions of air abstracted from the main air supply line leading from the compressor.

The process, as stated above, primarily relates to the removal of oxygen yet it is advantageous particularly in cold weather to remove as far as possible the water and other readily condensable constituents from the gas leaving the reaction zone, which may be accomplished by the final condenser and separator or absorber shown in the drawing.

It has been found that the temperature at which complete removal of oxygen from the gas is effected in the reaction chamber varies with the type of catalyst used. For instance, it has been found that with platinum as a catalyst, the removal of oxygen starts at a minimum temperature of about 400° F. under atmospheric pressure, but that with an exposure of approximately ten seconds the removal of the oxygen is not completed until the temperature has reached about 750° F. It has likewise been observed, however, that under the above conditions the removal of the oxygen is nearly 90% complete at about 550° F. With copper or copper oxide as a catalyst the removal of oxygen is complete at about 700° F. under atmospheric pressure conditions, while removal is only 15% complete at 550° F. under the conditions above described. Porous alundum as a catalyst gives substantially complete removal of oxygen from the gas at a temperature around 1270° F. A gas-air mixture passed through an empty pyrex glass tube heated to its softening point (about 1500° F.) reacted to removal of about 60% of its oxygen content. The chief function of a good catalyst apparently is to cause the reaction to proceed to completion at a relatively low temperature, which temperature can be obtained and maintained practically with simpler and cheaper engineering materials and a greater degree of safety. Safety is a paramount requirement in handling gas under high pressures. With the present process the iron and other materials employed in the construction of the apparatus are never heated to a temperature approaching that at which their physical strength or properties would be materially affected. Another advantage of using a low reaction temperature is that it may be maintained with the addition of a comparatively small portion of air to the gas under treatment, thus allowing successful operation of the process without addition of external heat when the heating value of the gas being treated for removal of oxygen is too low to allow of addition of a large proportion of air.

It has been found that when manganese dioxide is used as a catalyst it undergoes reduction with the formation of a lower oxide and that an equilibrium is reached as the reaction proceeds between the proportions of the dioxide and a lower oxide of manganese in the catalyst zone, the material apparently tending to be both reduced and oxidized to form lower and higher oxides in turn. A complete removal of the oxygen content of natural gas using manganese dioxide catalyst has been obtained at 650° F. under atmospheric pressure conditions. The oxides of copper, iron, nickel, palladium, chromium, molybdenum, cerium and other metals forming higher and lower oxides behave in a manner similar to manganese dioxide. It has been observed that as the pressures maintained in the reaction chamber are increased above atmospheric, the tendency in every case is to lower the minimum temperature at which the reaction is initiated. For this reason, it is difficult to state in a given case what will be the minimum temperature of reaction without prior knowledge as to the particular type of catalyst employed as well as of the pressures employed in the reaction temperature and the type of gas under treatment. The degree of preheat supplied to one or both constituents of the reaction mixture also controls the minimum temperature of the reaction, in cases where preheaters are employed to assist in maintaining the temperature necessary to make the reaction self-sustaining in its practical operation. It has been observed that complete removal of the oxygen from the gas or from the gas-air mixture is effected when the period of exposure to the catalyst material is as short as one-fifth of a second or less.

The process may be illustrated by the following example:

This illustration is of a run in which it was desired to remove the oxygen so as to render the gas non-corrosive and at the same time produce a gas having a constant heat value. The natural gas used for this run varied from 1290 to 1150 B. t. u. (net) the pressure and flow of which were held constant at 55 lbs. and 206,000 cubic feet per day. The air percentage was regulated during the run to give a gas having a net heating value of 1000 B. t. u. During this run a total of 390,963 cubic feet of gas and 117,500 cubic feet of air were mixed and treated giving 493,965 cubic feet of 1000 B. t. u. gas. By simple calculation it will be seen that the gas volume has increased 103,000 cubic feet or 26.4% of the inlet gas. This increase is equivalent to 88% of the volume of air added.

In the example given above a pressure of 55 pounds was used, but the process is not limited to any particular pressure either above or below atmospheric, good results having been obtained below, and as high as four hundred or more pounds per square inch above atmospheric pressure. It is obvious, however, that for a given unit the gas through-put will increase as the pressure is increased. Certain other advantages have also been obtained when operating at relatively high pressures, for example, the resulting gas contained less carbon dioxide and water than was obtained at lower pressures and the increase in the volume of combustible gas was more than the volume of the air added, which may also be accounted for by the conversion referred to.

Aside from the highly important result of rendering natural or combustible gas non-corrosive and thus saving enormous sums which must be expended annually for repairs and new equipment to replace corroded mains, meters, pumping apparatus, etc., the gas produced as a result of the process has a more uniform heat value and consequently gives better results as a domestic heating fuel than the natural gas which was subjected to the treatment. It is well-known that high B. t. u. natural gases containing substantial percentages of saturated hydrocarbon compounds have a tendency to deposit soot on cooking utensils, whereas the gas produced by the process described above has a less tendency to soot and gives a "quick" blue flame, which is very desirable in domestic heating. Furthermore, the gas produced by the present process because of its improved character actually gives as much or more usable heat per unit volume than does the original natural gas. Certain of these advantages may be due to the fact that heating appliances are not adapted to use a gas of upwards of 1100 B. t. u. which at times may vary to 1500 B. t. u. or above.

Where the natural gas or other gas to be treated by the process contains sulphur in the form of hydrogen sulphide or other compounds, and when platinum for example, is used as a catalyst, it is advisable to remove these compounds from the gas prior to the present treatment. The removal of these sulphur compounds may be accomplished by any well-known heat or absorption method. Such removal is not always essential when catalysts are employed which are not poisoned by sulphur, such for example as $V_2O_5$, tho it may be advisable under certain conditions. Gases of this type containing sulphur compounds and which also contain air are much more corrosive than natural gas containing no sulphur because of the interaction between the iron oxides and the sulphur to form iron sulphides. This interaction gives rise to pitting and hence a more rapid destruction of the gas handling equipment.

The detailed description of one mode of carrying out the invention has been limited more or less to the treatment of natural gas. However, it is to be understood that the invention is not limited to treating natural gas but the principle hereof may be applied to the treatment of any gas. Thus if it is desired, for example, to remove free oxygen from a non-combustible oxygen-bearing gas, the process of the present invention can be applied by adding to the gas to be treated a sufficient amount of a combustible material to combine chemically with the oxygen. Likewise certain details of the process may be varied,— for example the particular mode of heating the reaction chamber is only one example of how it may be heated in starting the reaction.

While the invention has been described in considerable detail it will be apparent to those skilled in the art to which this invention pertains that the use of temperature measuring instruments as well as gas meters and recording calorimeters at various points in the apparatus are essential to the success of the process. Also, that certain operations may be controlled automatically, as for example the regulation of the amount of air introduced by the reaction temperature or the valves 22 or 42 by the temperature in the reaction zone.

The term "air" as used in the specification and claims is to be understood as including oxygen or any oxygen carrying or producing gas adapted for use in the above process.

What is claimed as new is:

1. The process of treating hydrocarbon-containing gas having small amounts of free-oxygen associated therewith to remove the said free oxygen, comprising mixing additional free oxygen therewith in amounts sufficient to react at a preselected elevated temperature with a portion of the hydrocarbon constituents of the said gas, and thereby to develop sufficient heat to maintain the said reaction temperature but insufficient to cause uncontrolled rise of temperature above the said preselected temperature.

2. The process as defined in claim 1 in which the reaction is caused to occur under superatmospheric pressure.

3. The process of treating hydrocarbon containing gas having small amounts of free oxygen associated therewith, to render said gas non-corrosive, comprising adding additional controlled amounts of free oxygen thereto in amounts insufficient to prevent control of the temperature of the resultant reaction while, promoting such reactions at an elevated temperature between substantially all of said free oxygen and a portion of the hydrocarbon constituents of said gas, and maintaining said elevated temperature by the chemical reactions taking place between the free oxygen and a portion of the hydrocarbon constituents of the gas.

4. The process as defined in claim 1 in which the added free oxygen is in the form of air, in volume less than half the volume of the hydrocarbon-containing gas.

5. The process of treating hydrocarbon-containing gas having small amounts of free oxygen associated therewith for removing therefrom the said oxygen, comprising adding controlled amounts of free oxygen thereto, promoting chemical combination reactions at a preselected controlled temperature in the range from about 400° F. to about 1000° F. between substantially all of the said free oxygen and a portion only of the hydrocarbon constituents of said gas, and maintaining the controlled reaction temperature by the heat developed by the said chemical combination reactions.

6. The process of treating a combustible gas containing hydrocarbons and free oxygen to remove therefrom the free oxygen content, which comprises contacting the gaseous mixture at an elevated temperature in the neighborhood of 1000° F. with a catalyst, thereby combining the free oxygen content of the gas with a portion of the hydrocarbon content, and maintaining the said elevated reaction temperature by the exothermic heat developed by the said reaction.

7. The process as defined in claim 6, in which a preselected quantity of air is added to the said gas prior to contacting it with the catalyst, for facilitating the maintenance of the reaction temperature, while preventing uncontrolled rise of the temperature substantially above such temperature.

8. The process of treating hydrocarbon-containing gas, comprising mixing with said gas less than its volume of air, contacting the mixture with a suitable catalyst at a pre-selected elevated temperature in the range between 400° F. and 1000° F., while maintaining the said preselected temperature by the heat of reaction between the air and a portion of the hydrocarbon-containing gas, cooling the gaseous and vaporous products of the said reaction, and separating liquids condensed therefrom.

9. The process as defined in claim 8, in which the reaction temperature is controlled and maintained in part by regulating the volume of air in the gas-air mixture and in part by imparting regulated amounts of preheat to the mixture before exposing the same at the said elevated reaction temperature to the catalyst.

10. The process of treating natural gas which comprises compressing the said gas, removing readily condensible constituents and hydrogen sulphide therefrom, mixing preselected small amounts of air with the thus stripped gas, passing the resultant mixture at a preselected elevated reaction temperature through a hot bed of refractory material having a catalyst associated therewith, maintaining the said mixture and said bed at the reaction temperature by the heat of reaction between the air and a portion of the natural gas, and thereafter cooling the reaction mixture and removing therefrom the readily condensible constituents.

11. The process of treating a mixture of hydrocarbon containing combustible gas and less than 10% its volume of free oxygen comprising, placing and maintaining said mixture under a pressure above 50 lbs. per square inch and heating said mixture to a controlled elevated temperature above 550° F. and below 1000° F. in a reaction zone for a period sufficient to effect combustion reactions between all of the free oxygen and part of the hydrocarbon content of the mixture, adjusting the oxygen content of the mixture treated in accordance with the desired calorific value of the gaseous product, and separating liquid products of the reaction from the gaseous product.

12. The process of treating combustible gas to remove its free oxygen content comprising mixing a definite proportion of air with said gas, passing the mixture into contact with a catalyst in a heated reaction zone and preventing the temperature in said zone from rising above a desired maximum by adding steam to the mixture in said zone.

13. The process of treating combustible gas which comprises mixing a definite relatively small proportion of air with said gas, promoting chemical combination reactions between the combustible constituents of said mixture, removing readily condensible constituents from the resulting combustible gas, successively treating the resulting combustible gas in the same manner after mixing additional relatively small proportions of air therewith, preventing the temperature in each of said stages of treatment from rising above a desired maximum by controlling the volume of air in the mixture treated in each stage, and regulating the total volume of air employed in the treatment to produce a final combustible gaseous product of desired uniform heating value.

14. The process of reforming a hydrocarbon gas of high calorific value to produce a combustible gas of substantially lower calorific value, which comprises reacting a substantial portion of the hydrocarbons of the first-mentioned gas at an elevated temperature in a reaction chamber with an oxygen-supplying gas in amounts insufficient to cause uncontrolled rise in temperature of the resultant gaseous reaction mixture but sufficient to maintain controlled temperature conditions in the reaction chamber, subsequently flowing the highly heated, combustible gaseous reaction mixture into a second reaction chamber, mixing therewith another small portion of oxygen-supplying gas, and repeating this succession of steps until the calorific value of the combustible gas has been lowered to a predetermined point.

15. The process as set out in claim 14, in which the oxygen-supplying gas is mixed with the combustible gas, in amounts less than 8% of the gas-air mixture.

16. The process as defined in claim 14, in which the said reactions are carried out under superatmospheric pressure.

17. The process as set out in claim 14, together with the successive steps of cooling the reaction mixtures, and removing therefrom any condensate during the interval following each of the said treatments with the oxygen-supplying gas.

18. The continuous process for manufacturing from hydrocarbon-containing gas, of a reformed combustible gas of larger total volume but of lower calorific value per unit volume, which comprises mixing the said hydrocarbon-containing gas with air in amounts sufficient to provide a gas mixture having a total oxygen content sufficient to support combustion of a substantial portion of the hydrocarbon, passing the mixture into a reaction zone wherein a temperature is maintained ranging from about 400° F. to about 1000° F. depending upon the characteristics of the hydrocarbon-containing gas used and upon the calorific value desired in the reformed gas, carrying out the reactions in the reaction zone under the direct influence of the heat derived largely from the combustion between the oxygen content of the mixture and selected portions of the hydrocarbon content thereof, and withdrawing the resultant oxygen-free combustible gas of substantially uniform calorific value.

JOHN C. WALKER.